(12) United States Patent
Tanabe et al.

(10) Patent No.: US 6,220,787 B1
(45) Date of Patent: Apr. 24, 2001

(54) SHIP TYPE FLOATING OIL PRODUCTION SYSTEM

(75) Inventors: Akio Tanabe; John Randolph Paulling, both of Chiba (JP)

(73) Assignee: Japan National Oil Corporation (JP)

( * ) Notice: Subject to any disclaimer, the term of this patent is extended or adjusted under 35 U.S.C. 154(b) by 0 days.

(21) Appl. No.: 09/154,107

(22) Filed: Sep. 16, 1998

(30) Foreign Application Priority Data

May 19, 1998 (JP) .................................................. 10-153722

(51) Int. Cl.[7] .............................. E21D 11/00; F16L 1/12; E63B 21/00
(52) U.S. Cl. ....................... 405/169; 405/152; 405/192; 405/202; 405/224.2; 114/230.12; 114/230.13; 166/355; 166/359; 166/360; 441/5
(58) Field of Search ..................... 405/188, 192, 405/158, 169, 202, 224.2, 185; 166/355, 359, 360, 367, 368; 114/230.12, 230.13; 441/4, 5

(56) References Cited

U.S. PATENT DOCUMENTS

| | | | | |
|---|---|---|---|---|
| 3,299,645 | * | 1/1967 | Link ...................................... | 405/192 |
| 3,548,516 | * | 12/1970 | Lanphier et al. ..................... | 405/192 |
| 4,264,234 | * | 4/1981 | Pras ..................................... | 405/158 |
| 4,436,048 | * | 3/1984 | Gentry et al. ........................ | 114/230 |
| 4,448,568 | * | 5/1984 | Gentry et al. ........................ | 405/169 |
| 4,601,252 | * | 7/1986 | Wuttudal .............................. | 114/230 |
| 4,690,181 | * | 9/1987 | Carrio .................................. | 141/388 |
| 4,995,762 | * | 2/1991 | Goldman .............................. | 405/195 |
| 5,147,148 | * | 9/1992 | White et al. ......................... | 405/199 |
| 5,330,293 | * | 7/1994 | White et al. ......................... | 405/211 |
| 5,823,131 | * | 10/1998 | Boatman et al. .................... | 114/230 |
| 5,823,837 | * | 10/1998 | Boatman et al. ........................ | 441/5 |
| 5,857,808 | * | 1/1999 | De Baan .............................. | 405/224 |
| 5,860,382 | * | 1/1999 | Hobdy .................................. | 114/230 |
| 5,893,334 | * | 4/1999 | Poranski, Sr. ........................ | 114/230 |

* cited by examiner

Primary Examiner—Eileen D. Lillis
Assistant Examiner—Gary S. Hartmann
(74) Attorney, Agent, or Firm—Adams & Wilks (57) ABSTRACT

A ship type floating oil production system for access to subsea wells through installation of surface wellheads on a ship type surface vessel on the sea comprises a cylindrical turret moored to a seabed is located within a moon pool formed in the ship type surface vessel such that the ship type surface vessel is freely rotatable about the cylindrical turret. A plurality of riser pipes have a rigid structure and extend downward to subsea wells through the cylindrical turret, and each riser pipe is provided at its top portion with a surface wellhead including valves of the riser pipe. Accordingly, workover operations can be facilitated as needed by running workover tools through the surface wellhead of the corresponding riser pipe through use of a work-over-rig installed on the ship type surface vessel.

20 Claims, 7 Drawing Sheets

SHIP TYPE FLOATING OIL PRODUCTION SYSTEM

BACKGROUND OF THE INVENTION

1. Field of the Invention

The present invention relates to a weathervaning floating oil or gas production system configured to transport oil or gas from subsea wells to a ship type surface vessel on the sea.

2. Description of the Related Art

A ship type floating oil production system has been used as an off-shore oil/gas development platform. In such a system, in order to cope with pitching and rolling of a surface vessel induced by external forces, conduits called flexible risers are used to connect subsea wellheads and the surface vessel carrying processing facilities, thereby enabling the transporting of a produced fluid from subsea wells to the surface vessel on the sea. In such a system, when access to wells becomes necessary for workover operations or like work, another surface vessel specifically designed for such work must be chartered. Accordingly, in an offshore oil/gas field involving frequent access to wells, the economical efficiency of oil/gas development is worsened by the chartering of such a surface vessel.

SUMMARY OF THE INVENTION

In view of the above mentioned problems involved in the conventional ship type floating oil production system, an object of the present invention is to provide a weathervaning floating oil production system which simplifies access to subsea wells through installation of surface wellheads on a ship type surface vessel on the sea.

To achieve the above object, the present invention provides a weathervaning floating oil or gas production system comprising a ship type surface vessel, a cylindrical turret, a plurality of riser pipes, a plurality of surface wellheads, a manifold, and a swivel mechanism. The cylindrical turret is located within a moon pool formed in the ship type surface vessel and moored to a seabed. The riser pipes have a rigid structure and extend downward to subsea wells through the cylindrical turret. The surface wellheads include valves of the riser pipes and are connected to a production flow line on the ship type surface vessel via the manifold and the swivel mechanism.

Preferably, the riser pipes are arranged along the inner circumference of the turret, and the ship type floating oil production system further comprises a workover rig for workover operations and a riser pipe movement mechanism. The workover rig stands, along the vertical centerline or central ovis of the turret, on the ship type surface vessel via support legs. The riser pipe movement mechanism is adapted to move each riser pipe to a position located just under the workover rig.

Preferably, the riser pipe movement mechanism comprises a ringed support frame, a plurality of stationary guide rails, and a swivel guide rail. The ringed support frame is concentrically arranged within the cylindrical turret. The stationary guide rails extend radially between the ringed support frame and the cylindrical turret for guiding respective riser pipes. The swivel guide rail is rotatably provided within the ringed support frame so as to be selectively connected to one of the stationary guide rails in order to further guide to a position located just under the workover rig a riser pipe which has been guided to the ringed support frame along the corresponding stationary guide rail.

Each of the riser pipes preferably has a connector located under the bottom surface of a bottom portion of the ship type surface vessel.

The ship type floating oil production system preferably further comprises a diver entrance chamber and water introduction-discharge means provided in a bottom portion of the ship type surface vessel in the vicinity of a lower end portion of the turret. The diver entrance chamber is equipped with an inner watertight door and an outer watertight door and used by a diver who engages in disconnecting or connecting the connectors. The water introduction-discharge means introduces water into or discharge water from the diver entrance chamber.

In the weathervaning floating oil or gas production system of the invention, the ship type surface vessel is freely rotatable about the cylindrical turret located within the moon pool formed in the ship type surface vessel. Accordingly, as in the case of a conventional ship type floating oil production system, a bow portion of the ship type surface vessel faces to windward. Therefore, the ship type surface vessel is moored in a state less resistant to wind. Also, oil is safely transported from subsea wells to the system through the riser pipes which extend downward to the subsea wells through the cylindrical turret.

The riser pipes have a rigid structure, and the surface wellheads including valves of the riser pipes are connected to the production flow line on the ship type surface vessel via the manifold and the swivel mechanism. Accordingly, oil or gas is smoothly transported to the processing facilities or a storage tank on the ship type surface vessel, irrespective of a rotational movement of the ship type surface vessel. During workover operations, the rigid structure of a riser pipe facilitates the run of workover tools through the surface wellhead of the corresponding riser pipe to thereby facilitate workover operations, in contrast with the conventional workover operations in which a flexible riser pipe is disconnected from a subsea wellhead and another ship engages in carrying out workover operations through the wellhead. Thus, the cost of workover operations is significantly reduced as compared to the conventional workover operations.

Also, since the workover rig stands on the ship type surface vessel along the vertical centerline of the turret, and the riser pipe movement mechanism is provided just under the rig for moving each of the rigid riser pipes arranged along the inner circumference of the turret, the workover operations for wells, which are carried out through respective riser pipes, can be carried out significantly efficiently and promptly.

Further, the riser pipe movement mechanism is configured to move each riser pipe to a central portion of the cylindrical turret by means of the stationary guide rails and the swivel guide rail. The stationary guide rails extend radially from the ringed support frame arranged concentrically in the turret toward respective riser pipes arranged along the inner circumference of the turret. The swivel guide rail is selectively connected to one of the stationary guide rails. Accordingly, the workover operations for wells, which are carried out through movement of each of the riser pipes to a central portion of the turret, can be carried out far more efficiently.

Also, since each of the riser pipes has a connector located under the bottom surface of the ship type surface vessel, the ship type surface vessel can be evacuated to a safe sea area through disconnection of the connectors, for example, when the approach of a typhoon is forecasted. In this case, the upper ends of the riser pipes are plugged, and marker buoys are attached to respective riser pipes.

Further, since the diver entrance chamber equipped with the inner and outer watertight doors and the water introduction-discharge means for the chamber are provided in a bottom portion of the ship type surface vessel in the vicinity of a lower end portion of the turret, there is facilitated the disconnection or connection of the connectors by a diver who enters the water from the entrance chamber. Accordingly, upon issuance of, for example, a typhoon warning, the ship type surface vessel can be promptly evacuated. When a diver is to enter into water, the diver enters the diver entrance chamber through the inner watertight door, and then water is introduced into the chamber. Then, the outer watertight door is opened, so that the diver can enter into water. When the diver is to return to the ship type surface vessel, the reverse procedure of dispatch is performed.

DESCRIPTION OF THE PREFERRED EMBODIMENTS

Embodiments of the present invention will next be described in detail with reference to the drawings.

Figure 1:
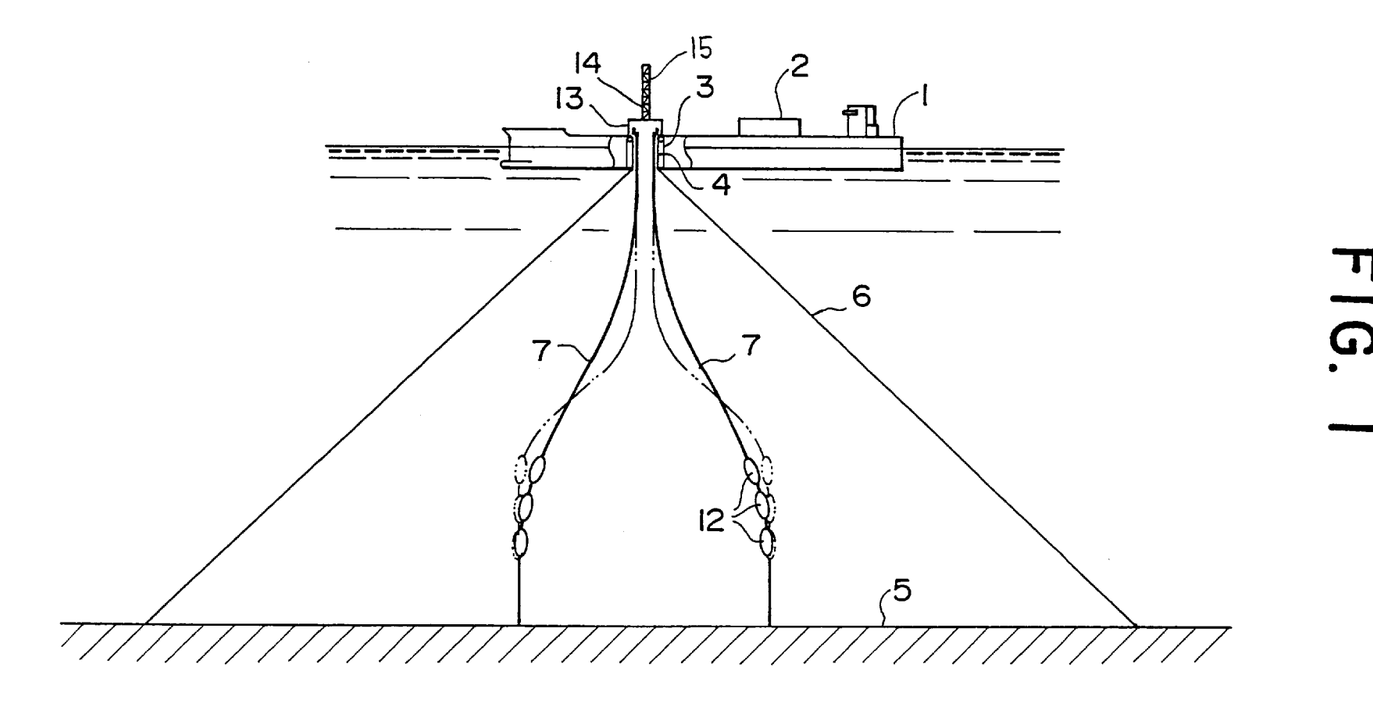
FIG. 1 is a schematic side view showing the overall structure of a weathervaning floating oil or gas production system according to an embodiment of the present invention.
Figure 2:
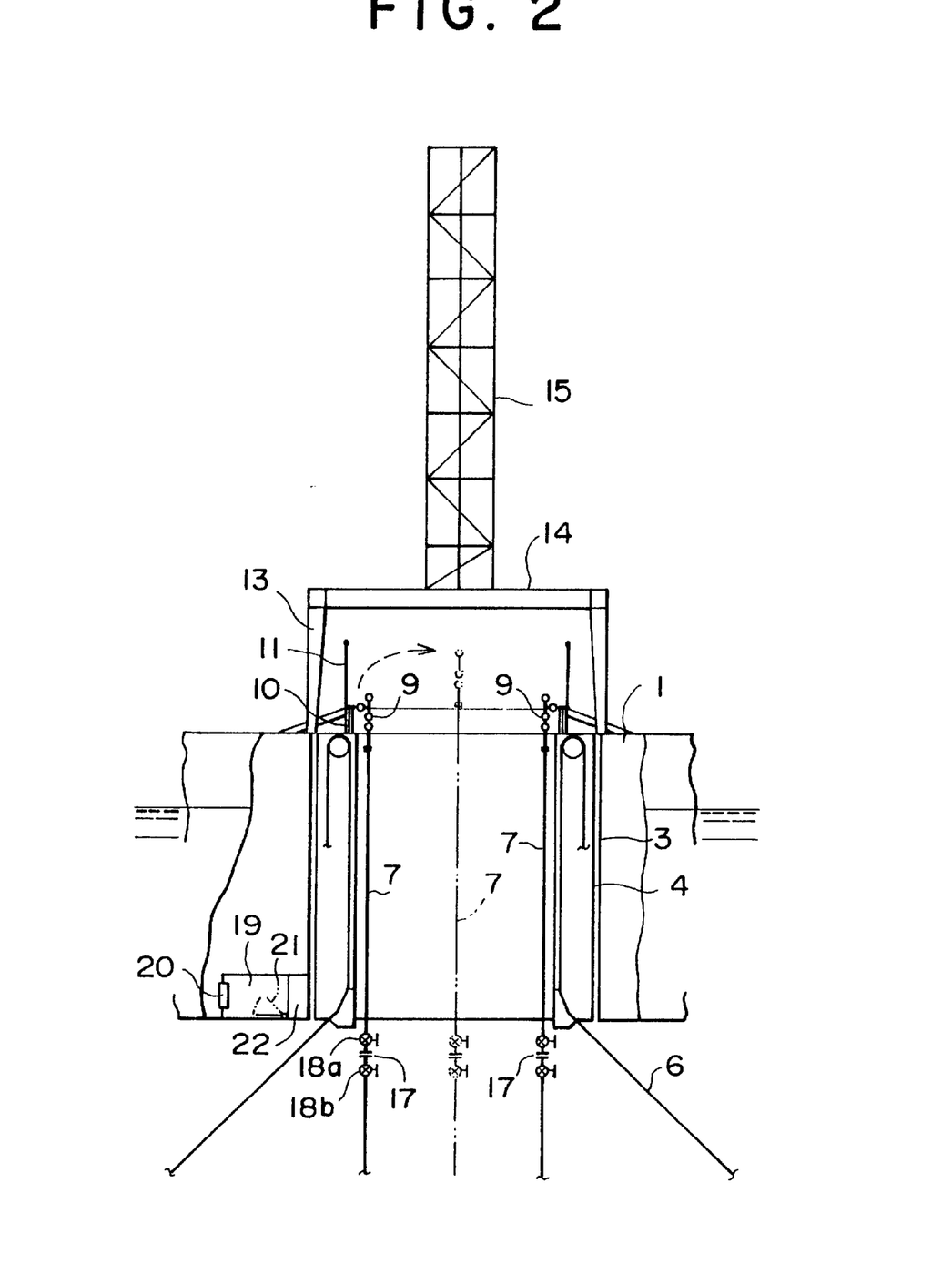
FIG. 2 is an enlarged vertical cross-sectional view showing a main portion of the system of FIG. 1.

As shown in FIGS. 1 and 2, a tanker type ship type surface vessel 1 carries processing facilities 2 for produced oil. A cylindrical turret 4 having a hollow interior or center portion is disposed in a moon pool 3 formed vertically through the ship type surface vessel 1. The turret 4 is moored to a seabed 5 by means of mooring lines 6. Thus, the ship type surface vessel 1 can rotate or angularly displace about the turret 4 in accordance with environmental forces such as a wind force or tidal current.

Twelve riser pipes 7 extend downward to subsea wells through the cylindrical turret 4 and are equally spaced along the inner circumference of the turret 4. Each riser pipe 7 has a rigid structure implemented through use of a double-walled steel pipe.

Figure 5:
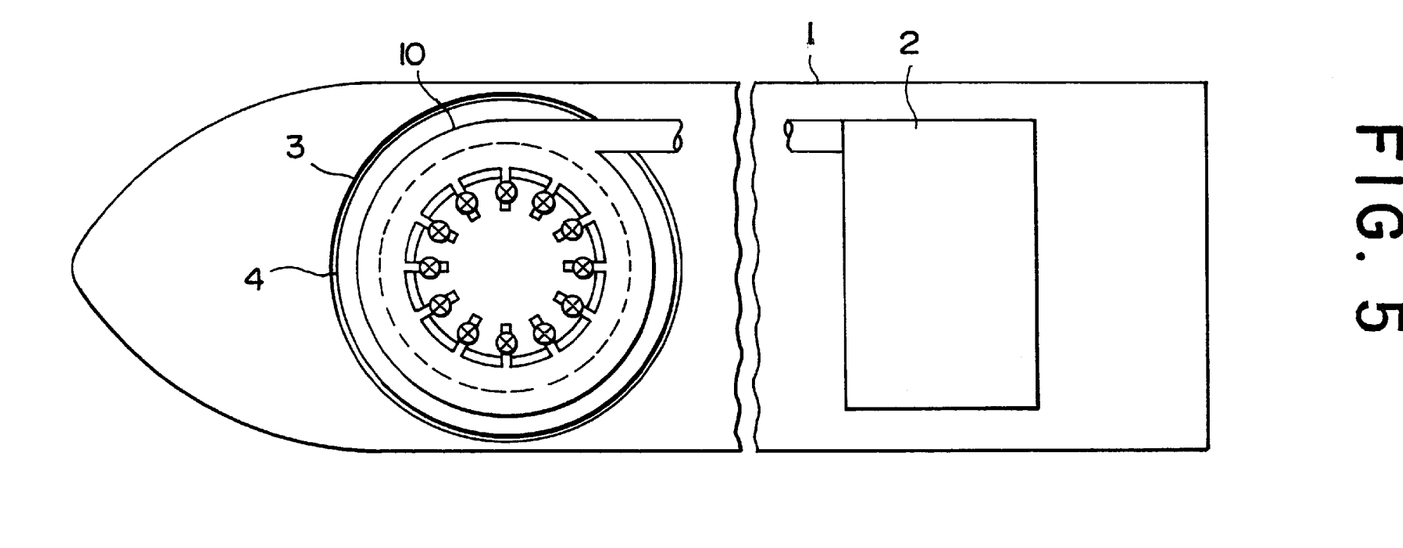
FIG. 5 is a schematic plan view showing a manifold-swivel mechanism on a turret in the system of FIGS. 1 and 2.
Figure 6:
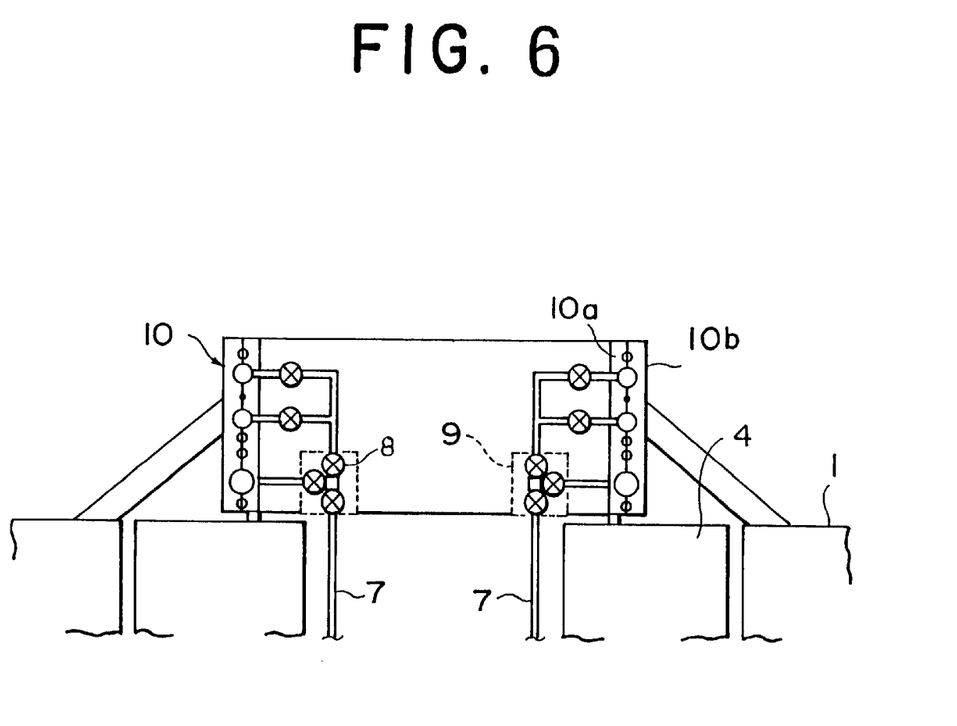
FIG. 6 is a vertical cross-sectional view showing the manifold-swivel mechanism of FIG. 5.

According to the present embodiment, a surface wellhead (Christmas tree) 9 including valves 8 is provided at a top portion of each riser pipe 7. As shown in FIGS. 2, 5, and 6, the riser pipes 7 are connected to a production flow line 11 through the surface wellheads 9 and a manifold-swivel mechanism 10.

The manifold-swivel mechanism 10 includes a manifold and a swivel mechanism serving as a produced fluid passageway which allows the ship type surface vessel 1 to swivel. As shown in FIG. 6, an inner circumferential portion 10a of the manifold-swivel mechanism 10 stands on the turret 4. An outer circumferential portion 10b of the manifold-swivel mechanism 10 is supported by the ship type surface vessel 1 in such a manner as to be sidable with respect to the inner circumferential portion 10a. The inner and outer portions 10a and 10b have confronting annular parts which, as shown in FIG. 6, are connected to form a swivel, and the annular parts have central openings vertically aligned with the hollow center portion of the turret 4. Accordingly, the ship type surfice vessel 1 can rotate or angularly displace with respect to the turret 4 such that a produced fluid flows smoothly via the manifold-swivel mechanism 10.

As shown in FIG. 1, a plurality of buoyancy members 12 are attached to a lower portion of each riser pipe 7, thereby supporting the riser pipe 7 in a posture perpendicular to the seabed 5. Further, as shown by a chain line in FIG. 1, an upper portion of each riser pipe 7 is deformable in a gently curved shape, in accordance with heaving of the ship type surface vessel 1, within the allowable range of slight deflection (compliancy) of its rigid structure.

Figure 3:
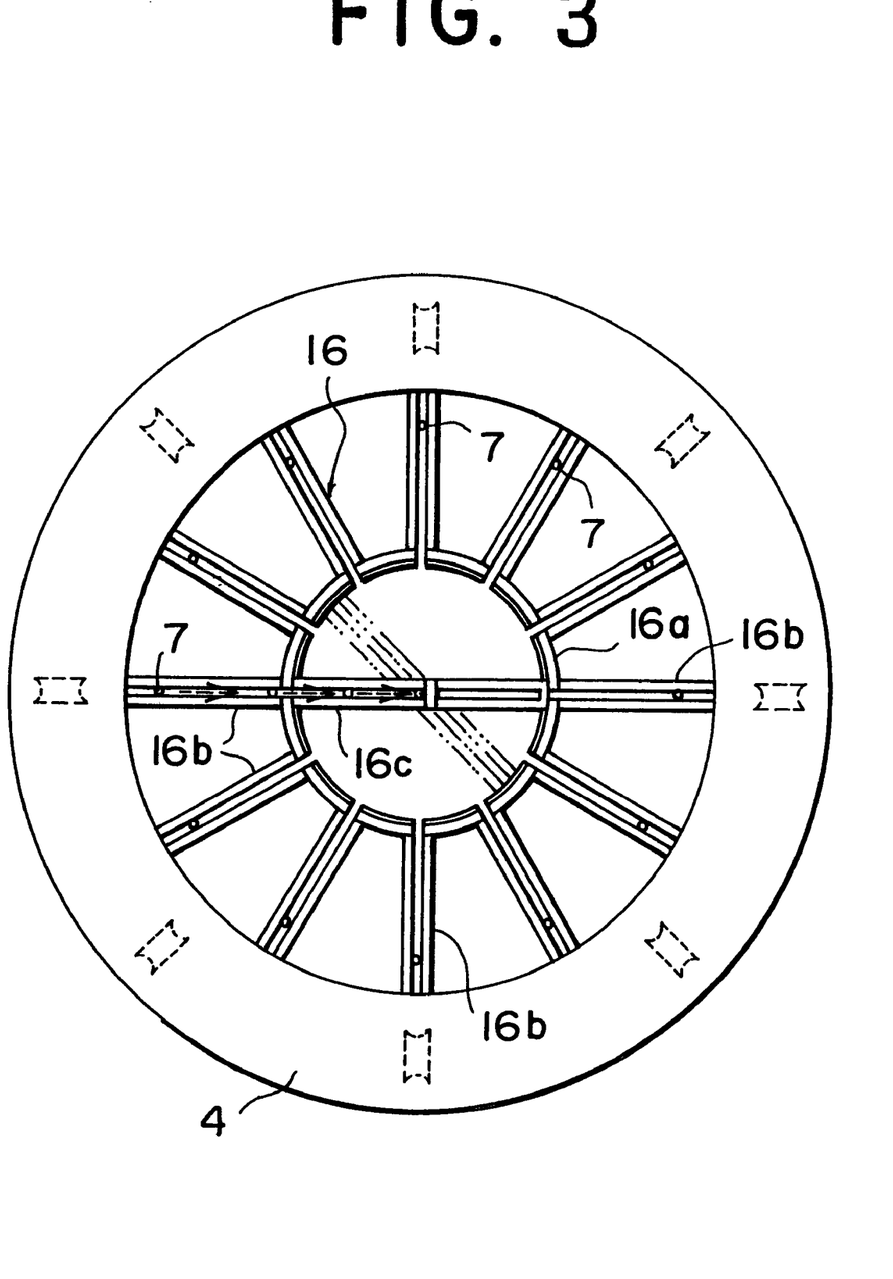
FIG. 3 is a plan view of a riser pipe movement mechanism in the system of FIGS. 1 and 2.
Figure 4:
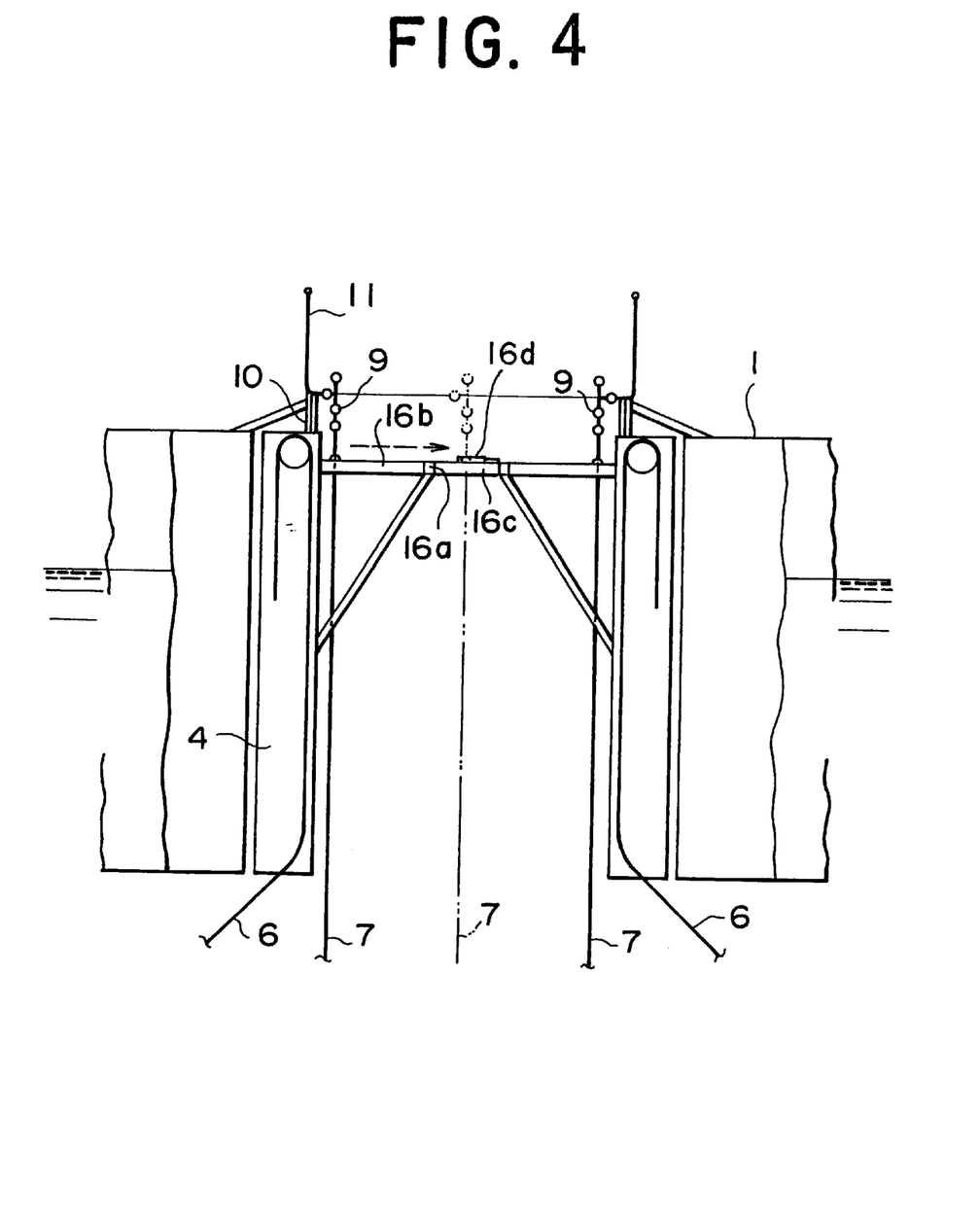
FIG. 4 is a vertical cross-sectional view of the riser pipe movement mechanism of FIG. 3.

Further, as shown in FIGS. 1 and 2, a workover rig 15 stands, along the vertical centerline of the turret 4, on a work deck 14 which is supported on the ship type surface vessel 1 by support legs 13. As shown in FIGS. 3 and 4, a riser pipe movement mechanism 16 is provided such that the mechanism 16 can move each riser pipe 7 to a position located just under the workover rig 15.

Specifically, the riser pipe movement mechanism 16 includes a ringed support frame 16a, a plurality of stationary guide rails 16b, and a swivel guide rail 16c. The ringed support frame 16a is disposed concentrically within the cylindrical turret 4. The stationary guide rails 16b extend radially between the ringed support frame 16a and the cylindrical turret 4 for guiding respective riser pipes 7. The turntable type swivel guide rail 16c is rotatably provided within the ringed support frame 16a so as to further guide to a position located just under the workover rig 15 the riser pipe 7 which has been guided to the ringed support frame 16a along the corresponding stationary guide rail 16b. In this manner, the swivel guide rail 16c is selectively connectable to any of the stationary guide rails 16b.

In place of the riser pipe movement mechanism 16, a trolley may be attached onto the lower surface of the work deck 14 so as to move each riser pipe 7 by means of the trolley.

As shown in FIG. 2, each riser pipe 7 has a connector 17 located under the bottom surface of a bottom portion of the ship type surface vessel 1. Valves 18a and 18b are located respectively above and under the connector 17.

A diver entrance chamber 19 is provided in a bottom portion of the ship type surface vessel 1 in the vicinity of a lower end portion of the turret 4 and is used by a diver who engages in disconnecting or connecting the connectors 17. The diver entrance chamber 19 is equipped with an inner watertight door 20 and an outer watertight door 21. Water introduction-discharge equipment chamber 22 is also provided in the bottom portion and has water introduction-discharge means (a pump and valves) for introducing water into or discharging water from the diver entrance chamber 19.

Figure 7:
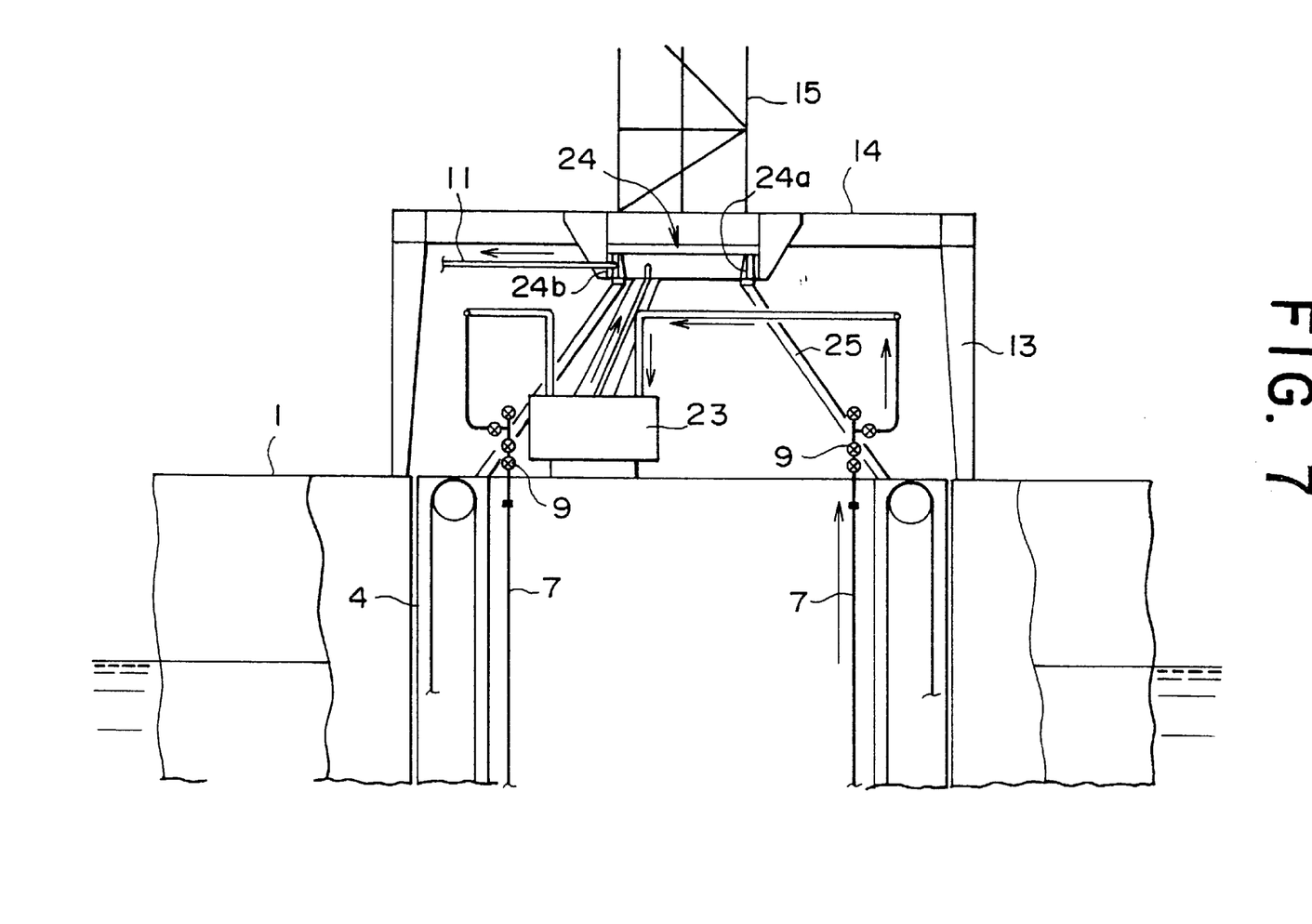
FIG. 7 is a vertical cross-sectional view showing a modification of the manifold-swivel mechanism of FIG. 2 in which a manifold and a swivel mechanism are separated from each other.

The above-mentioned manifold-swivel mechanism 10 is configured such that a manifold and a swivel mechanism are integrated into a single unit. However, a manifold and a swivel mechanism may be provided separately. FIG. 7 shows a modification of the manifold-swivel mechanism 10 in which a manifold 23 and a swivel mechanism 24 are separated from each other. Fluid transported through the riser pipes 7 is collected in the manifold 23 on the turret 4 and is then sent to the production flow line 11 via the swivel mechanism 24. The swivel mechanism 24 includes a ringed inner tank 24a and a ringed outer tank 24b. Fluid collected in the manifold 23 is sent to the inner tank 24a. The outer tank 24b is provided in such a manner as to be sidable along the outer circumference of the inner tank 24a while maintaining communication with the inner tank 24a.

The inner tank 24a is supported on the turret 4 by braces 25. The outer tank 24b is supported by the work deck 14, which, in turn, is supported on the ship type surface vessel 1, and connected to the production flow line 11.

As described above, also when the manifold 23 and the swivel mechanism 24 are separated from each other, the ship type surface vessel 1 can rotate with respect to the turret 4 without hindering transport of fluid collected through the riser pipes 7 to processing facilities on the ship type surface vessel 1.

In place of the swivel mechanism 24, which allows the ship type surface vessel 1 to swivel, another passageway, such as a flexible line, that allows the surface vessel 1 to swivel may be used.

In the ship type floating oil production system of the present embodiment described above, the ship type surface vessel 1 is freely rotatable about the cylindrical turret 4 located within the moon pool 3 formed in the ship type surface vessel 1. Accordingly, as in the case of a conventional ship type floating oil production system, a bow portion of the ship type surface vessel 1 faces to windward. Therefore, the ship type surface vessel 1 is moored in a state less resistant to wind. Also, oil is safely transported from subsea wells to the system through the riser pipes 7 which extend downward to the subsea wells through the cylindrical turret 4.

The riser pipes 7 have a rigid structure, and the surface wellheads 9 including valves of the riser pipes 7 are connected to the production flow line 11 on the ship type surface vessel 1 via the manifold 10 and the swivel mechanism 24. Accordingly, oil or gas is smoothly transported to the processing facilities 2 or a storage tank on the ship type surface vessel 1, irrespective of a rotational movement of the ship type surface vessel 1. During workover operations, the rigid structure of the riser pipe 7 facilitates the run of workover tools through the surface wellhead 9 of the corresponding riser pipe 7 to thereby facilitate workover operations, in contrast with the conventional workover operations in which a flexible riser pipe is disconnected from a subsea wellhead and another ship engages in carrying out workover operations through the wellhead. Thus, the cost of workover operations is significantly reduced as compared to the conventional workover operations.

Also, since the workover rig 15 stands on the ship type surface vessel 1 along the vertical centerline of the turret 4, and the riser pipe movement mechanism 16 is provided just under the rig 15 for moving each of the rigid riser pipes 7 arranged along the inner circumference of the turret 4, the workover operations, which are carried out through respective riser pipes 7, can be carried out significantly efficiently and promptly.

Further, the riser pipe movement mechanism 16 is configured to move each riser pipe 7 to a central portion of the cylindrical turret by means of the stationary guide rails 16b and the swivel guide rail 16c and through use of a skid jack 16d or the like. The stationary guide rails 16b extend radially from the ringed support frame 16a arranged concentrically in the turret 4 toward respective riser pipes 7 arranged along the inner circumference of the turret 4. The swivel guide rail 16c is selectively connected to one of the stationary guide rails 16b. Accordingly, the workover operations, which are carried out through movement of each of the riser pipes 7 to a central portion of the turret 4, can be carried out far more efficiently.

Also, since each of the riser pipes 7 has the connector 17 located under the bottom surface of the ship type surface vessel 1, the ship type surface vessel 1 can be evacuated to a safe sea area through disconnection of the connectors 17, for example, when the approach of a typhoon is forecasted. In this case, the upper ends of the riser pipes 7 are plugged, and marker buoys are attached to respective riser pipes 7.

Further, since the diver entrance chamber 19 equipped with the inner and outer watertight doors 20 and 21, respectively, and the water introduction-discharge equipment chamber 22 are provided in a bottom portion of the ship type surface vessel 1 in the vicinity of a lower end portion of the turret 4, there is facilitated the disconnection or connection of the connectors 17 by a diver who enters into water from the entrance chamber 19. Accordingly, upon issuance of, for example, a typhoon warning, the ship type surface vessel 1 can be promptly evacuated. When a diver is to enter into water, the diver enters the diver entrance chamber 19 through the inner watertight door 20, and then water is introduced into the chamber 19 by the water introduction-discharge means provided in the water introduction-discharge equipment chamber 22. Then, the outer watertight door 21 is opened, so that the diver can enter into water. When the diver is to return to the ship type surface vessel 1, the reverse procedure of dispatch is performed.

What is claimed is:

1. A floating oil or gas production system comprising:
   a surface vessel;
   a cylindrical turret located within a moon pool formed in the surface vessel and moored to a seabed;
   a workover rig supported on the surface vessel and located on a vertical central axis of the turret;
   a plurality of riser pipes having a rigid structure and extending downward to subsea wells through the cylindrical turret;
   a riser pipe movement mechanism for moving each riser pipe to a position vertically beneath the workover rig;
   a plurality of surface wellheads having valves connected to the riser pipes; and
   a manifold and a swivel mechanism for connecting the surface wellheads to a production flow line on the surface vessel.

2. A floating oil or gas production system according to claim 1, wherein the riser pipes are arranged along the inner circumference of the turret.

3. A floating oil or gas production system according to claim 2, wherein the riser pipe movement mechanism comprises
   a ringed support frame arranged concentrically within the cylindrical turret;
   a plurality of stationary guide rails extending radially between the ringed support frame and the cylindrical turret for guiding the respective riser pipes; and
   a swivel guide rail provided rotatably within the ringed support from, the swivel guide rail being selectively connected to one of the stationary guide rails in order to further guide to a position located beneath the workover rig the riser pipe which has been guided to the ringed support frame along the corresponding stationary guide rail.

4. A floating oil or gas production system according to claim 3, wherein each of the riser pipes has a connector located under the bottom surface of a bottom portion of the surface vessel.

5. A floating oil or gas production system according to claim 4, further comprising a diver entrance chamber provided in a bottom portion of the surface vessel in the vicinity of a lower end portion of the turret, the diver entrance chamber being equipped with an inner watertight door and an outer watertight door and used by a diver who engages in disconnecting or connecting the connectors; and water introduction-discharge means provided in the bottom portion for introducing water into or discharging water from the diver entrance chamber.

6. A floating oil or gas production system according to claim 2, wherein each of the riser pipes has a connector located under the bottom surface of a bottom portion of the surface vessel.

7. A floating oil or gas production system according to claim 6, further comprising a diver entrance chamber provided in a bottom portion of the surface vessel in the vicinity of a lower end portion of the turret, the diver entrance chamber being equipped with an inner watertight door and an outer watertight door and used by a diver who engages in disconnecting or connecting the connectors; and water introduction-discharge means provided in the bottom portion for introducing water into or discharging water from the diver entrance chamber.

8. A floating oil or gas production system according to claim 1, wherein each of the riser pipes has a connector located under the bottom surface of a bottom portion of the surface vessel.

9. A floating oil or gas production system according to claim 8, further comprising a diver entrance chamber provided in a bottom portion of the surface vessel in the vicinity of a lower end portion of the turret, the diver entrance chamber being equipped with an inner watertight door and an outer watertight door and used by a diver who engages in disconnecting or connecting the connectors; and water introduction-discharge means provided in the bottom portion for introducing water into or discharging water from the diver entrance chamber.

10. A weathervaning floating oil or gas production system comprising:

a surface vessel having a moon pool;

a cylindrical mooring and riser support turret having a vertical central axis and being located within the moon pool and moored to a seabed to allow the surface vessel to align with environmental forces acting thereon and to rotate at least a full 360 degrees about the vertical central axis;

a plurality of riser pipes having a rigid structure and being supported partially by buoyancy and partially by top tension from the turret to allow relative vertical and horizontal motions between the surface vessel and the seabed;

a plurality of surface wellheads having surface production valves located atop the riser pipes;

a riser pipe centering system for moving one riser pipe at a time to the vertical central axis of the turret to enable each riser pipe to be accessed from above;

a workover rig located on the vertical central axis of the turret above the surface production valves; and a mechanism for connecting the surface wellheads to a production flowline on the surface vessel, allowing direct access along the vertical centerline of the turret for the lowering of tools and equipment into the well bore by the workover rig, and allowing the turret and the surface vessel to rotate relative to each other at least a full 360 degrees.

11. A weathervaning floating oil or gas production system according to claim 10; wherein the riser pipes are arranged along the inner circumference of the turret.

12. A weathervaning floating oil or gas production system according to claim 11; wherein the riser pipe centering system comprises a ringed support frame arranged concentrically within the cylindrical turret;

a plurality of stationary guide rails extending radially between the ringed support frame and the cylindrical turret for guiding the respective riser pipes; and a swivel guide rail provided rotatably within the ringed support from, the swivel guide rail being selectively connected to one of the stationary guide rails in order to further guide to a position located beneath the workover rig the riser pipe which has been guided to the ringed support frame along the corresponding stationary guide rail.

13. A weathervaning floating oil or gas production system according to claim 10; wherein each of the riser pipes has a connector located under the bottom surface of a bottom portion of the surface vessel.

14. A weathervaning floating oil or gas production system according to claim 13; further comprising a diver entrance chamber provided in a bottom portion of the surface vessel in the vicinity of a lower end portion of the turret, the diver entrance chamber being equipped with an inner watertight door and an outer watertight door and used by a diver who engages in disconnecting or connecting the connectors; and water introduction-discharge means provided in the bottom portion for introducing water into or discharging water from the diver entrance chamber.

15. A weathervaning floating oil or gas production system, comprising:

a surface vessel having a moon pool;

a turret disposed to undergo rotation within the moon pool and moored to a seabed to permit the surface vessel to undergo angular displacement about the turret in response to environmental forces acting on the surface vessel;

a plurality of riser pipes extending downwardly to subsea wells through a hollow center portion of the turret;

a plurality of surface wellheads supported by the turret and connected through valving to respective ones of the riser pipes;

a swivel mechanism having a first portion supported by the turret and a second portion supported by the surface vessel for connecting the surface wellheads to a production flow line on the surface vessel irrespective of the angular displacement of the surface vessel relative to the turret;

a workover rig disposed above the swivel mechanism in vertical alignment with the hollow center portion of the turret; and means for individually moving an upper end portion of each riser pipe to a position vertically beneath the workover rig.

16. A weathervaning floating oil or gas production system according to claim 15; wherein the first and second portions of the swivel mechanism have annular parts connected together to form a swivel, the annular parts having central openings vertically aligned with the hollow center portion of the turret.

17. A weathervaning floating oil or gas production system according to claim 15; wherein the means for individually moving an upper end portion of each riser pipe is mounted on the turret.

18. A weathervaning floating oil or gas production system according to claim 15; further including a diver entrance chamber located in a bottom portion of the surface vessel in the vicinity of the turret.

19. A weathervaning floating oil or gas production system according to claim 15; wherein the riser pipes have a rigid structure.

20. A weathervaning floating oil or gas production system according to claim 15; wherein the riser pipes have a double-walled steel structure.

* * * * *